Patented Feb. 12, 1946

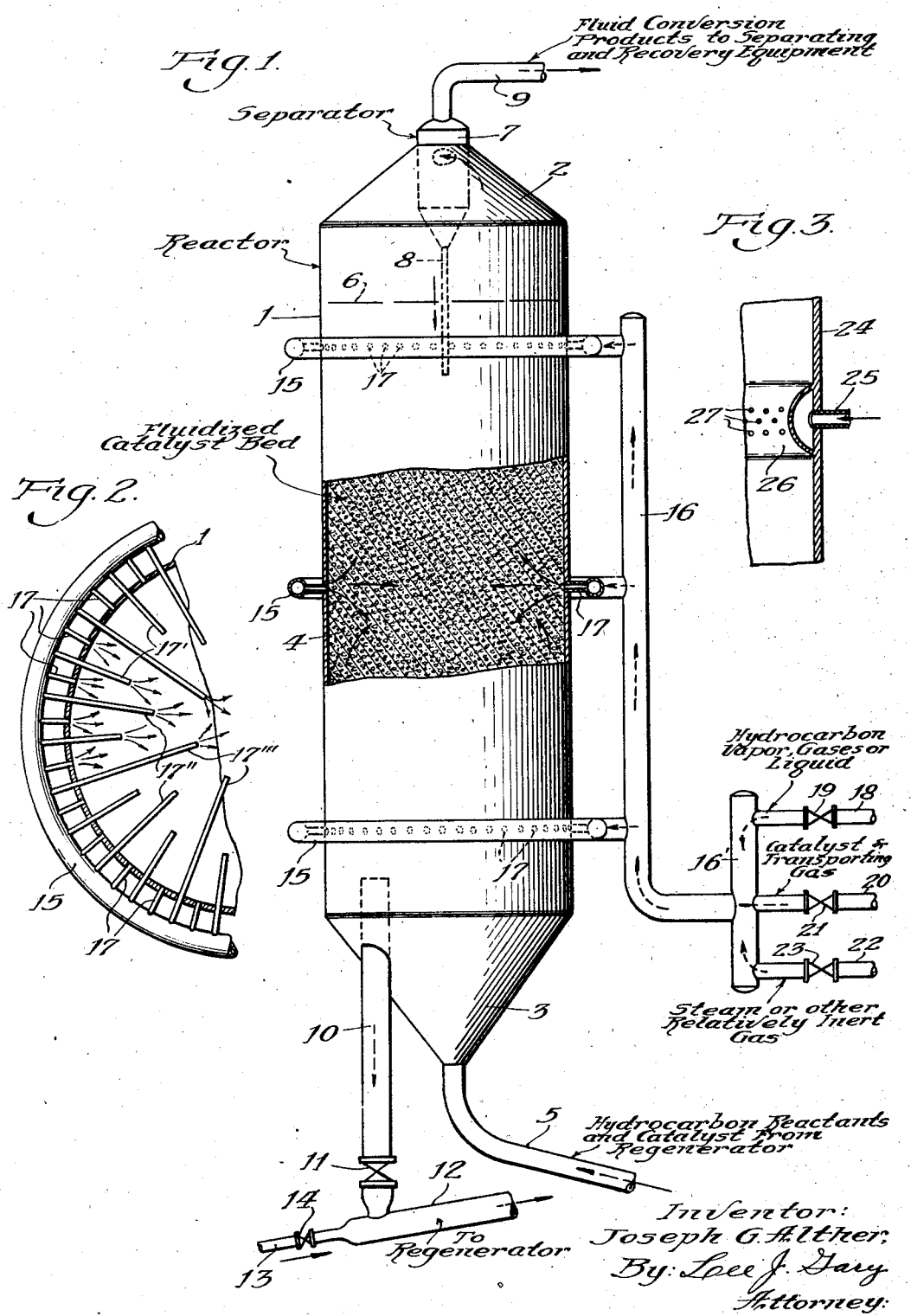

2,394,651

UNITED STATES PATENT OFFICE 2,394,651

CONTACT CONVERSION REACTION

Joseph G. Alther, Chicago, Ill., assignor to Universal Oil Products Company, Chicago, Ill., a corporation of Delaware Application May 31, 1943, Serial No. 489,157

12 Claims. (Cl. 196—52)

The invention relates to an improved process and apparatus for the conversion of fluid reactants in contact with a moving mass of subdivided solid particles which supply heat to, abstract heat from and/or catalyze the desired reaction.

One operation of the general type to which the present invention is addressed comprises the catalytic cracking of hydrocarbons by a method known as "fluid bed" operation. In this operation the hydrocarbons are passed, in vaporous state and at the temperature required for effecting catalytic cracking thereof, upwardly through a fluid-like bed of powdered solid cracking catalyst maintained within an elongated vertically disposed reaction vessel. The catalyst bed is maintained in a turbulent fluid-like state by the gas-lift action of the vaporous hydrocarbon reactants and resulting vaporous and gaseous conversion products working opposite to the effect of gravity on the solid catalyst particles. At the vapor and gas velocities employed, this results in the phenomenon known as "hindered settling," the net upward velocity of the vaporous and gaseous hydrocarbons being greater than that of the solid catalyst particles. In this type of operation the lower and usually the major portion of the fluid bed has a relatively high density due to the high concentration of catalyst particles therein, while the upper portion of the bed is materially less dense and contains a much lower concentration of solid particles. The lower, dense phase, portion of the bed has the appearance of a boiling liquid and the upper, light phase, portion of the bed has the appearance of smoke.

Fluid bed operation, such as above outlined, is being put to extensive commercial use in the catalytic cracking of hydrocarbons boiling above the range of gasoline to produce aviation base gasoline of high octane rating and/or motor gasoline of high antiknock value. It is also being extensively applied to the retreatment of highly olefinic gasoline or gasoline fractions to materially reduce their olefin content and improve their susceptibility to antiknock agents, such as lead tetraethyl. Such operations commonly employ cracking catalysts of the silica-alumina type prepared either synthetically or from natural clays.

Fluid bed operation has also been applied to the catalytic dehydrogenation of normally liquid and normally gaseous hydrocarbons employing suitable subdivided solid dehydrogenating catalysts, such as alumina-chromium oxide, for example, and it has proven particularly advantageous as applied to the catalytic aromatization of normally liquid hydrocarbons with dehydrogenating or aromatizing catalysts (alumina-chromium oxide, for example) to produce highly aromatic gasoline fractions from paraffins, olefins and naphthenes boiling within the range of gasoline and to produce selected aromatics, such as benzene, toluene and xylenes from paraffinic and olefinic hydrocarbons containing a corresponding number of carbon atoms.

Numerous other conversion reactions, including, for example, the thermal cracking of normally liquid and normally gaseous hydrocarbons in the presence of relatively inert subdivided solid contact material are advantageously conducted in the fluid bed type of system. Another example of its advantageous use is found in the exothermic regeneration of subdivided solid catalytic or contact material which has been reduced in activity or become fouled by the deposition thereon of deleterious heavy combustible conversion products. Fluid bed regeneration of the contaminated catalyst, using air or other oxygen-containing gas to burn the combustible deposits from the catalyst particles in the regenerating step, is generally employed as a part of processes employing fluid bed operation in the endothermic catalytic conversion of hydrocarbons.

The present invention is addressed to improvements which are applicable to and will be found advantageous in any process employing the fluid bed type of operation. The invention is, therefore, not limited to catalytic cracking, retreating, dehydrogenation, aromatization, thermal cracking or any other specific hydrocarbon conversion reaction, nor is it limited to processes for the conversion of hydrocarbons generally, since it may be advantageously applied to regeneration and to a wide variety of other chemical reactions or conversion processes.

In conducting numerous experiments to determine the nature of fluid bed operations generally and learn more of what takes place in the reaction vessel, I have employed glass models to observe the condition of the fluidized bed. This has led to the discovery that the contact obtained between the fluid reactants and the subdivided solid particles of catalyst or contact material in the fluid bed is not as thorough and uniform as has been previously supposed and that a substantial portion of the reactants may traverse the bed without being intimately mixed with the solid particles. In observing the operations conducted in these glass models, it is clearly evident that some of the vaporous and gaseous reactants form relatively large bubbles or pockets which move upwardly through the bed. They are particularly noticeable along the confining walls of the reaction vessel. To obtain the desired contact between the fluid reactants and the particles of subdivided solid contact material, it is necessary to break up these pockets or bubbles and prevent their movement through all or a major portion of the bed. The invention is primarily addressed to this particular objective.

I have found that the aforementioned objective can be achieved by inducing rapid movement of solid particles in the fluid bed transverse to the general direction of flow of the fluid reactants and resulting conversion products through the bed. Preferably, this transverse movement of solid particles is induced at a plurality of spaced points in the height of the dense phase portion of the fluid bed and there are numerous specific ways and means whereby this may be accomplished. For example, I may inject or blow subdivided solid particles of the catalyst or contact material into the fluid bed in a direction generally transverse to the upward movement of the fluid reactants and conversion products and at any required number of points in the bed. The solid catalyst or contact particles thus introduced into the bed may be transported in a portion of the reactants to be converted or in a stream of suitable relatively inert fluid. On the other hand, blowing or injecting a portion of the fluid reactants or a stream of relatively inert fluid transversely into the bed will impart transverse movement to adjacent solid particles of the bed and accomplish the desired result.

When a relatively inert fluid is employed for the above purpose, either alone or with solid particles, its choice will depend, of course, upon the nature of the particular conversion reaction being conducted. Steam, for example, is often employed as a relatively inert diluent and for its partial pressure effect in the reaction zone and may be supplied thereto in the manner above mentioned, either alone or as a transporting medium for particles of subdivided solid catalyst or contact material. Nitrogen, carbon dioxide, hydrocarbon gases and the like are examples of other materials which may be employed for the intended purpose in some reactions. As applied to the regeneration of subdivided solid catalyst or contact material, air or other oxygen-containing gas, air diluted with combustion gases or other relatively inert gas, or combustion gases substantially devoid of free oxygen may be introduced into the fluid bed transverse to the general upward flow of oxidizing gas and resulting combustion gases to induce transverse movement of the subdivided solid particles undergoing regeneration.

It will be apparent from the above that various other methods and means of breaking up the gas bubbles or pockets which tend to form in the fluid bed may be employed, such as, for example, mechanical impellers, stirrers and the like. The use of other means, such as will be readily apparent to a skilled mechanic, is considered within the scope of the broad aspects of the invention. However, I do not intend to imply that other means, such as impellers, mechanical stirrers and the like, is the equivalent of blowing or injecting solid particles or a portion of the fluid reactants or other fluid transversely into the bed, as above mentioned, nor that all of the various materials which may be thus blown or injected into the bed are equivalent or will have the same effectiveness in producing the desired result.

In the accompanying drawing,

Figure 1 diagrammatically illustrates one specific form of apparatus, such as provided by the invention and in which the improved process provided by the invention may be conducted.

Figure 2 of the drawing is a fragmentary sectional view on a horizontal plane illustrating a modification of the injector means shown in Figure 1.

Figure 3 of the drawing is a fragmentary sectional view on a vertical plane illustrating another modification of the injector means shown in Figure 1.

Referring to Figure 1 of the drawing, the reaction vessel 1 here illustrated is of substantially cylindrical form and vertically disposed with substantially conical upper and lower heads 2 and 3, respectively. A mid-portion of the cylindrical wall of the reaction vessel is cut away in the drawing to show it in cross-section and indicate the fluid-like bed 4 of subdivided solid catalyst. Fluid reactants to be converted, such as hydrocarbon vapors or gases, for example, are supplied to the lower portion of the reaction vessel through line 5, the catalyst preferably being in the highly heated state at which it is withdrawn from a similar regenerating vessel, not illustrated, and being transported from the regenerator to the reactor in the incoming stream of hydrocarbons or other fluid reactants to be converted. The incoming commingled stream of fluid reactants and catalyst particles is distributed substantially uniformly across the vessel as it travels upwardly through the conical bottom section 2 and, when desired, a suitable distributing grid, such as a perforate plate or the like, not illustrated, may be disposed across the vessel at about the elevation where the lower head 3 meets the cylindrical shell.

The fluid bed 4 in the reaction vessel has a lower and major portion in which there is a relatively high concentration of catalyst particles due to their hindered settling. This is known as the dense phase region of the fluid bed and its approximate upper extremity is indicated by the broken line 6. The remaining upper portion of the fluid bed has a materially lower concentration of catalyst particles due to the substantial absence or reduced amount of hindered settling in this zone. The upper portion of the fluid bed is known as the light phase region.

Vaporous conversion products and entrained catalyst particles are directed from the light phase of the fluid bed to suitable separating equipment for the catalyst particles, such as, for example, the cyclone separator indicated at 7 which in this instance is mounted in the upper head of the vessel. Separated catalyst particles are directed from the lower portion of separator 7 through standpipe 8 back into the dense phase region of the fluid bed. The vaporous and/or gaseous conversion products separated from a major portion of the solid particles are directed from separator 7 through line 9 to fractionating and recovery equipment of any suitable conventional form, not illustrated.

In the particular fluid bed type operation here illustrated, a stream of catalyst particles is continuously withdrawn from the dense phase region of the fluid bed and directed downwardly through standpipe 10, having a suitable adjustable orifice or flow-control valve 11 adjacent its lower end, into transfer line 12, wherein the catalyst particles are commingled with a stream of the oxidizing gas employed for regenerating the catalyst and supplied through line 13 and valve 14. The oxidizing gas serves to transport the catalyst particles by its gas lift action to the lower portion of a regenerating vessel similar to reactor 1, but not here illustrated, wherein combustible contaminants are burned from the catalyst particles in a fluid-like bed similar to that maintained in the reaction vessel. In a similar manner, regenerated catalyst is withdrawn from the dense phase region of the fluid bed in the regenerator, commingled with the incoming stream of fluid reactants to be converted and transported thereby through line 5 back to the reactor. Other specific methods and means of establishing and maintaining the circulation of catalyst between and through the reaction and regenerating zones are known to those conversant with the art and may be employed within the scope of the invention.

The process and apparatus herein described in conjunction with the drawing is fairly typical of fluid bed operation as it is now practiced in the catalytic cracking of hydrocarbon oils. The improvement to such operation, as herein provided, resides in causing a rapid movement of catalyst particles in the dense phase of the fluid bed in a direction transverse to the general movement of the catalyst particles, reactants and conversion products through the bed.

With a relatively shallow fluid bed, effecting transverse movement of catalyst particles therein in a zone intermediate the opposite ends of the bed will accomplish the desired results and break up the gas or vapor bubbles or moving gas pockets in the bed. With a deeper fluid bed, best results are accomplished when transverse movement of the catalyst particles is effected in a plurality of zones intermediate the opposite ends of the bed. In the case illustrated, three spaced zones of transverse movement are employed by providing three distributing rings, each indicated at 15 in the drawing and each communicating with an inlet header 16 and a plurality of spaced outlet conduits 17 connecting the rings 15 with the interior of the reaction vessel. The inlet header 16 communicates with another inlet header 16' to which various materials for effecting transverse movement of the catalyst particles within the fluid bed may be supplied. For example, a portion of the hydrocarbon vapors or gases to be converted by the reaction taking place within the vessel, or liquid hydrocarbon reactants, may be supplied through line 18 and valve 19, either alone or together with suspended particles of the subdivided solid catalyst. Alternatively, catalyst particles suspended in a stream of relatively inert transporting gas, such as light hydrocarbon gases, for example, may be supplied through line 20 and valve 21. Steam or other relatively inert gas other than hydrocarbon gases may be supplied, when desired, through line 22 and valve 23, either alone or together with suspended catalyst particles. The particular material chosen is directed from headers 16' and 16 to the distributing rings 15 and thence through the branch conduits 17 into the dense phase of the fluid bed at a plurality of relatively closely spaced points at each of the three elevations. The material is injected at a sufficient velocity to cause collision of the catalyst particles within the fluid bed with each other and effect a general and rapid movement of the catalyst particles from adjacent the cylindrical wall of the vessel toward its central portion.

When desired, and particularly in a reaction vessel of relatively large diameter, in addition to the conduits 17 terminating adjacent the interior surface of the shell of the vessel, other inlet conduits, such as indicated at 17', 17" and 17''' in Figure 2, may be provided to extend well into the fluid bed so that transverse movement of the catalyst particles is effected across substantially the entire diameter of the vessel.

Figure 3 illustrates one of the many possible modifications of the arrangement indicated in Figure 1 which may be employed to accomplish the improved mode of operation provided by the invention. In this figure a portion of the shell of the vessel is shown in longitudinal section and designated by the reference numeral 24. The fluid or fluid and suspended catalyst particles employed to effect transverse movement of the catalyst particles within the vessel is introduced at one or a plurality of points about the shell 24 through one or more inlet conduits indicated at 25, and a distributing plate substantially semi-circular in cross-section and indicated at 26 is provided within the vessel over the inlet conduit or conduits 25. Member 26 is provided with one or, preferably, several rows of perforations 27 which give better distribution for the entering fluid than the arrangement illustrated in Figure 1.

I claim:
1. A process for contacting a fluid reactant with a solid material which comprises introducing the fluid reactant to the lower portion of a relatively dense bed of subdivided solid contact material in a contacting zone at sufficient velocity to maintain the bed in a turbulent fluid-like state, passing the fluid reactant and solid particles of said bed through said zone in a generally vertical direction, and forcibly directing fluid toward the vertical axis of said bed from a plurality of points spaced around the periphery of the bed, whereby to induce rapid movement of solid particles within said bed transverse to said generally vertical direction.

2. A hydrocarbon conversion process which comprises maintaining a relatively dense bed of subdivided solid catalyst at conversion temperature in a reaction zone, passing hydrocarbons to be converted and solid particles of said bed through the reaction zone in a generally vertical direction, and forcibly directing fluid toward the vertical axis of said bed from a plurality of points spaced in a common horizontal plane around the periphery of the bed, whereby to induce rapid movement of solid particles within said bed transverse to said generally vertical direction.

3. The process as defined in claim 1 further characterized in that said fluid contains particles of said contact material.

4. The process as defined in claim 2 further characterized in that said fluid contains particles of said catalyst.

5. A process for contacting a fluid reactant with a solid material which comprises introducing the fluid reactant to the lower portion of a relatively dense bed of subdivided solid contact material in a contacting zone at sufficient velocity to maintain the bed in a turbulent fluid-like state, passing the fluid reactant and solid particles of said bed through said zone in a generally vertical direction, and forcibly directing regulated quantities of said subdivided solid material toward the vertical axis of said bed from a plurality of points spaced around the periphery of the bed, whereby to induce rapid movement of solid particles within said bed transverse to said generally vertical direction.

6. A hydrocarbon conversion process which comprises maintaining a relatively dense bed of subdivided solid catalyst at conversion temperature in a reaction zone, passing hydrocarbons to be converted and solid particles of said bed through the reaction zone in a generally vertical direction, and forcibly directing regulated quantities of said subdivided catalyst toward the vertical axis of said bed from a plurality of points spaced in a common horizontal plane around the periphery of the bed, whereby to induce rapid movement of solid particles within said bed transverse to said generally vertical direction.

7. A hydrocarbon conversion process which comprises maintaining a relatively dense bed of subdivided solid catalyst at conversion temperature in a reaction zone, introducing hydrocarbons to be converted to the lower portion of said bed at sufficient velocity to maintain the bed in a turbulent fluid-like state, passing solid particles of said bed and the hydrocarbons through the reaction zone in a generally vertical direction, and forcibly directing fluid toward the vertical axis of said bed from a plurality of points spaced around the periphery of the bed, whereby to induce rapid movement of solid particles within said bed transverse to said generally vertical direction.

8. The process as defined in claim 7 further characterized in that said fluid comprises a portion of the hydrocarbons to be converted.

9. A hydrocarbon conversion process which comprises maintaining a relatively dense bed of subdivided solid catalyst at conversion temperature in a reaction zone, introducing hydrocarbons to be converted to the lower portion of said bed at sufficient velocity to maintain the bed in a turbulent fluid-like state, passing solid particles of said bed and the hydrocarbons through the reaction zone in a generally vertical direction, and forcibly directing regulated quantities of said subdivided catalyst toward the vertical axis of said bed from a plurality of points spaced around the periphery of the bed, whereby to induce rapid movement of solid particles within said bed transverse to said generally vertical direction.

10. The process as defined in claim 7 further characterized in that said fluid contains particles of said catalyst.

11. A process for regenerating subdivided solid catalyst containing carbonaceous matter which comprises maintaining a relatively dense bed of the catalyst particles at combustion temperature in a regenerating zone, introducing oxygen-containing gas to the lower portion of said bed at sufficient velocity to maintain the bed in a turbulent fluid-like state, passing solid particles of the bed and said gas through the regenerating zone in a generally vertical direction, and forcibly directing fluid toward the vertical axis of said bed from a plurality of points spaced around the periphery of the bed, whereby to induce rapid movement of solid particles within said bed transverse to said generally vertical direction.

12. A process for regenerating subdivided solid catalyst containing carbonaceous matter which comprises maintaining a relatively dense bed of the catalyst particles at combustion temperature in a regenerating zone, introducing oxygen-containing gas to the lower portion of said bed at sufficient velocity to maintain the bed in a turbulent fluid-like state, passing solid particles of the bed and said gas through the regenerating zone in a generally vertical direction, and forcibly directing regulated quantities of the catalyst particles toward the vertical axis of said bed from a plurality of points spaced around the periphery of the bed, whereby to induce rapid movement of solid particles within said bed transverse to said generally vertical direction.

JOSEPH G. ALTHER.